United States Patent
Goodger et al.

(10) Patent No.: US 9,842,091 B2
(45) Date of Patent: Dec. 12, 2017

(54) SWITCHING TO AND FROM NATIVE WEB APPLICATIONS

(71) Applicant: GOOGLE INC., Mountain View, CA (US)

(72) Inventors: Ben Goodger, Mountain View, CA (US); Glen Murphy, Palo Alto, CA (US); Erik Kay, Belmont, CA (US)

(73) Assignee: Google LLC, Mountain View, CA (US)

(*) Notice: Subject to any disclaimer, the term of this patent is extended or adjusted under 35 U.S.C. 154(b) by 460 days.

(21) Appl. No.: 13/843,805

(22) Filed: Mar. 15, 2013

(65) Prior Publication Data

US 2014/0281897 A1 Sep. 18, 2014

(51) Int. Cl.
*G06F 17/00* (2006.01)
*G06F 17/22* (2006.01)
(Continued)

(52) U.S. Cl.
CPC .......... *G06F 17/2247* (2013.01); *G06F 9/441* (2013.01); *G06F 9/4406* (2013.01);
(Continued)

(58) Field of Classification Search
CPC .. G06F 9/455; G06F 17/2247; G06F 9/45537; G06F 8/61; G06F 9/441; G06F 9/4406; G06F 9/4856; G06F 13/105
(Continued)

(56) References Cited

U.S. PATENT DOCUMENTS 7,526,559 B1  4/2009 Phillips
7,681,134 B1*  3/2010 Grechishkin et al. ........ 715/740
(Continued)

FOREIGN PATENT DOCUMENTS

EP  1811747 A1  7/2007
WO  2014/150045 A1  9/2014

OTHER PUBLICATIONS

J. Meimei Ma at al., "Tips and Techniques for Moving Between Operating Environments", Feb. 1, 2002 SAS Institute, pp. 10.*
(Continued)

*Primary Examiner* — Chau Nguyen
(74) *Attorney, Agent, or Firm* — Brake Hughes Bellermann LLP

(57) ABSTRACT

According to one general aspect, a method may include executing, by a processor of a computing device, a web browser presentation environment. The method may also include presenting at least one web page within a context of the web browser presentation environment, wherein presenting within the web browser presentation environment includes maintaining a first presentation data structure that includes a web browser presentation data structure portion and a common presentation data structure portion. The method may further include receiving a request to move the presentation of the web page from the web browser presentation environment to an emulation-based presentation environment. The method may include moving the presentation of the web page from the web browser presentation environment to the emulation-based presentation environment, wherein moving includes maintaining a second presentation data structure that includes an emulation-based presentation data structure portion and the common data structure portion.

22 Claims, 7 Drawing Sheets

(51) Int. Cl.
*G06F 9/44* (2006.01)
*G06F 9/455* (2006.01)
*G06F 13/10* (2006.01)
*G06F 9/48* (2006.01)

(52) U.S. Cl.
CPC .......... *G06F 9/455* (2013.01); *G06F 9/45537* (2013.01); *G06F 9/4856* (2013.01); *G06F 13/105* (2013.01)

(58) Field of Classification Search
USPC ................................................ 715/234, 965
See application file for complete search history.

(56) References Cited

U.S. PATENT DOCUMENTS

| | | | |
|---|---|---|---|
| 7,689,566 B1* | 3/2010 | Nieuwejaar et al. | 707/999.01 |
| 7,734,717 B2* | 6/2010 | Saarimaki et al. | 709/217 |
| 2002/0129114 A1* | 9/2002 | Sundaresan et al. | 709/213 |
| 2007/0074223 A1* | 3/2007 | Lescouet | G06F 9/4812 718/108 |
| 2007/0078891 A1* | 4/2007 | Lescouet | G06F 9/4881 |
| 2007/0174300 A1* | 7/2007 | Kim | 707/10 |
| 2008/0155542 A1* | 6/2008 | Maigne | G06F 9/4843 718/100 |
| 2008/0195978 A1* | 8/2008 | Wissenbach et al. | 715/854 |
| 2008/0209493 A1* | 8/2008 | Choi et al. | 725/119 |
| 2012/0084542 A1* | 4/2012 | Reeves | G06F 13/14 713/1 |
| 2013/0167159 A1* | 6/2013 | Ricci | G06F 9/54 719/319 |
| 2013/0293573 A1* | 11/2013 | Wolfe | G06F 9/4443 345/629 |
| 2013/0298140 A1* | 11/2013 | Wolfe | G06F 9/542 719/319 |
| 2013/0298141 A1* | 11/2013 | Wolfe | G06F 8/61 719/319 |
| 2014/0108951 A1* | 4/2014 | Dharawat | G06F 9/543 715/747 |

OTHER PUBLICATIONS

Margaret Rouse, "Definition browser", Nov. 2007, Definition from WhatIs.com, pp. 7.*
Howard Fosdick, "How to Run Multiple Operating Systems", Feb. 3, 2011, published by OSnews, pp. 4.*
International Search Report and Written Opinion for PCT Patent Application No. PCT/US2014/021990, dated Jun. 12, 2014, 9 pages.

* cited by examiner

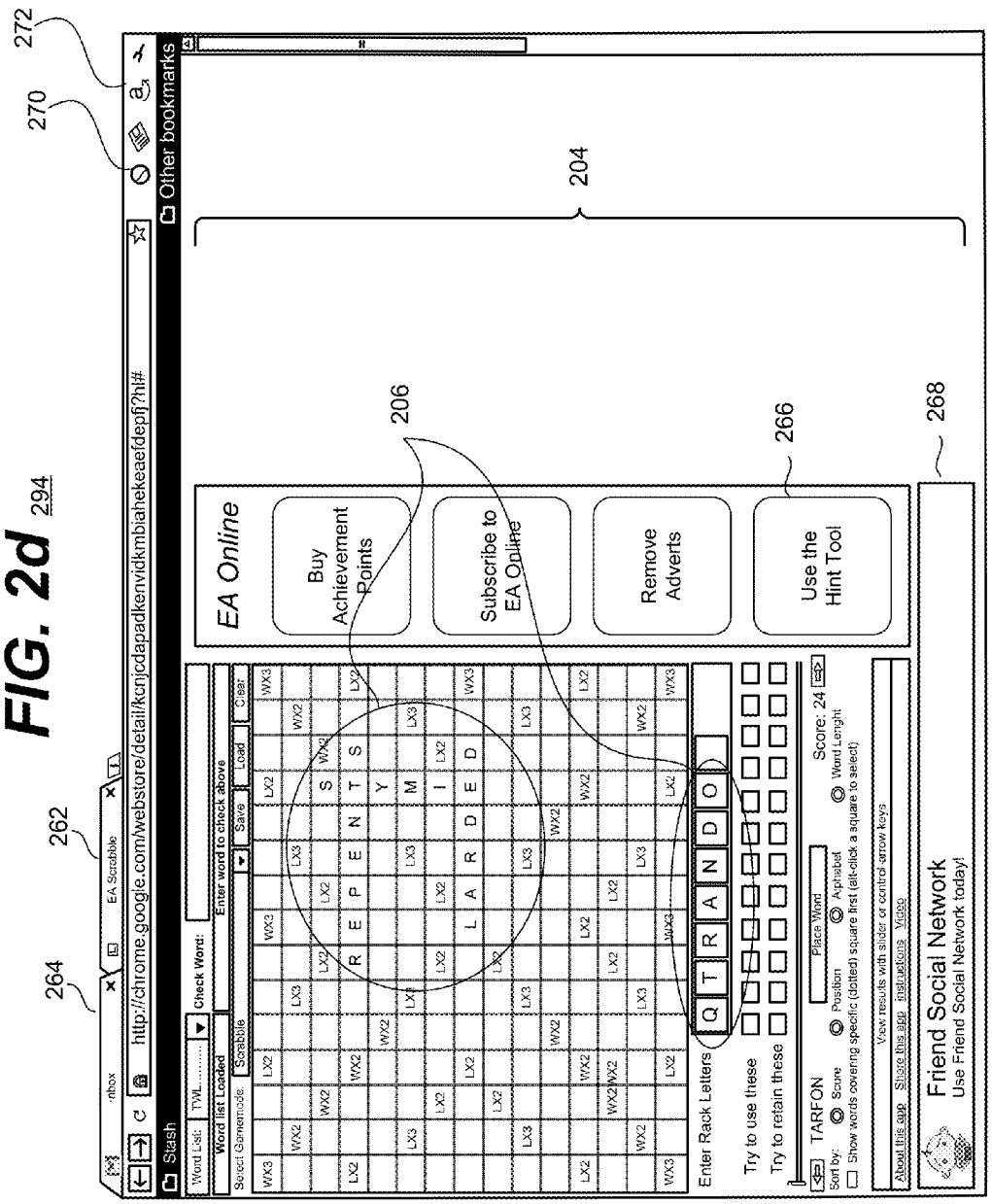

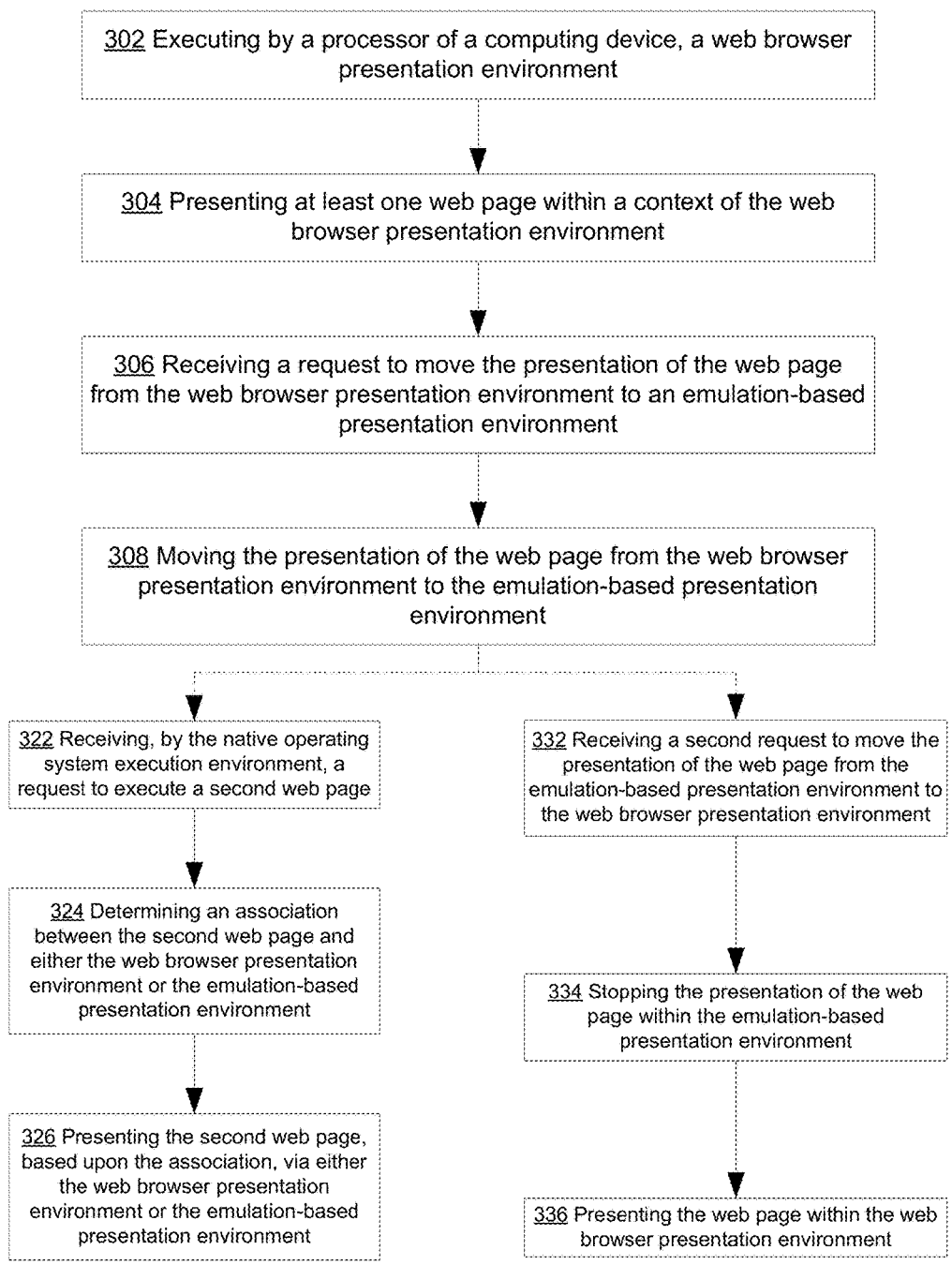

SWITCHING TO AND FROM NATIVE WEB APPLICATIONS

TECHNICAL FIELD

This description relates to web pages and web applications and their execution via a web browser and another application or operating system.

BACKGROUND

With the advent of the Internet, an application was created known as a "web browser". In this context, a "web browser" includes an application for retrieving, presenting, and traversing information resources on the World Wide Web or, more generally, the Internet. An information resource is generally identified by a Uniform Resource Identifier (URI) or a Uniform Resource Locator (URL) and may be a web page, image, video, or other piece of content. A web browser generally is executed by a processor and interacts with an underlying operating system as most traditional or native applications do.

Traditionally, a web browser may access a web site or a collection of web pages, scripts, etc. from a physically remote server or web server. The more advanced web sites may include active content (e.g., client-side scripts, server-side scripts, etc.) which allow content of information to be dynamically changed or asynchronously accessed. In general, these web sites would be loaded, processed, or displayed by a web browser without the installation of any permanent portion of the web site on the user's computer, although the web site may require the installation of a web-site agnostic third-party execution tool (e.g., Adobe Flash, Java Virtual Machine, etc.) or an individualized data file (e.g., a web cookie, etc.). However, in general, a user and web browser may traditionally browse and leave a traditional web site without substantial alteration or installation of the web site being stored on the user's local computing device Traditionally, computing has involved the use of native applications or computer software designed to help a user complete a single task or multiple tasks. Traditionally, these native applications have been executed locally by a processor or computing device either directly by the processor or with the mediation or assistance of an operating system (OS). In general an operating system is a piece of software that provides a common set of services to aid the execution of a host of applications and, more importantly, provides a low-level interface for the hardware of the computer and manages hardware functions such as input and output, memory allocation etc. Generally, the operating system acts as an intermediary between application programs and the computer hardware, although the application code is usually executed directly by the hardware and will frequently call the OS or be interrupted by it. Frequently, the OS is represented as being "between" the hardware and the applications.

Traditionally, a computing device may only execute one OS at a time. If a user wished to switch from a first operating system (e.g., Microsoft's WINDOWS) to a second operating system (e.g., Apple's OS X), the user would be required to turn off and turn the computing device back on (or reboot the computing device), and inform the computing device that it was to execute the second operating system. As operating systems generally use completely different sets of services to aid the execution of a host of applications and often use completely different file systems, there is generally a complete partitioning between different operating systems.

As such, when a user wished to switch from a first OS to a second OS, generally all of the applications executed in the first OS would have to cease execution and all unsaved data or working information associated with those applications would be lost. When the second OS was executed, a user wishing to resume their work would be unable to do so seamlessly as they did not have access to the unsaved data or working information associated with the applications that had been executed by the first OS. In fact, due to Operating Systems providing different sets of services to aid the execution of a host of applications, the applications executed by each OS generally were tailored to that OS and would not execute on another OS.

Frequently, this strict partitioning remains even when a virtual machine is executed by a host computing device or operating system. The guest or second OS executed by the virtual machine is unable to share data with the host or first OS or its applications. As such, the ability to seamlessly share data (e.g., unsaved data or working variables, etc.) between applications executing on different Operating Systems is generally not possible.

SUMMARY

According to one general aspect, a method may include executing, by a processor of a computing device, a web browser presentation environment. The method may also include presenting at least one web page within a context of the web browser presentation environment, wherein presenting within the web browser presentation environment includes maintaining a first presentation data structure that includes a web browser presentation data structure portion and a common presentation data structure portion. The method may further include receiving a request to move the presentation of the web page from the web browser presentation environment to an emulation-based presentation environment. The method may include moving the presentation of the web page from the web browser presentation environment to the emulation-based presentation environment, wherein moving includes maintaining a second presentation data structure that includes an emulation-based presentation data structure portion and the common data structure portion.

According to another general aspect, an apparatus may include a memory element and a processor. The memory element may be configured to store a first presentation data structure associated with a web page, the first presentation data structure including a web browser presentation data structure portion and a common presentation data structure portion, and store a second presentation data structure associated with the web page, the second presentation data structure including an emulation-based presentation data structure portion and the common data structure portion. The processor may be configured to present at least one web page within a web browser presentation environment, wherein presenting the web page within the web browser presentation environment includes maintaining the first presentation data structure, receive a request to move the presentation of the web page from the web browser presentation environment to an emulation-based presentation environment, give control of the common data structure portion to the emulation based presentation environment, and present the web page within the emulation-based presentation environment, wherein presenting within the emulation-based presentation environment includes maintaining the second presentation data structure.

According to another general aspect, a computer program product may be tangibly and non-transitorily embodied on a computer-readable medium. The computer program product may include executable code that, when executed, is configured to cause an apparatus to present at least one web page within a web browser presentation environment, wherein presenting within the web browser presentation environment includes maintaining a first presentation data structure that includes a web browser presentation data structure portion and a common presentation data structure portion, receive a request to move the presentation of the web page from the web browser presentation environment to an emulation-based presentation environment, and move the presentation of the web page from the web browser presentation environment to the emulation-based presentation environment, wherein moving includes maintaining a second presentation data structure that includes an emulation-based presentation data structure portion and the common data structure portion.

The details of one or more implementations are set forth in the accompanying drawings and the description below. Other features will be apparent from the description and drawings, and from the claims.

A system and/or method for executing web pages and web applications, substantially as shown in and/or described in connection with at least one of the figures, as set forth more completely in the claims.

BRIEF DESCRIPTION OF THE DRAWINGS

FIG. 2b is a diagram of an example embodiment of a user interface in accordance with the disclosed subject matter.

FIG. 2d is a diagram of an example embodiment of a user interface in accordance with the disclosed subject matter.

FIG. 3 is a flowchart of an example embodiment of a technique in accordance with the disclosed subject matter.

Like reference symbols in the various drawings indicate like elements.

DETAILED DESCRIPTION

Figure 1:
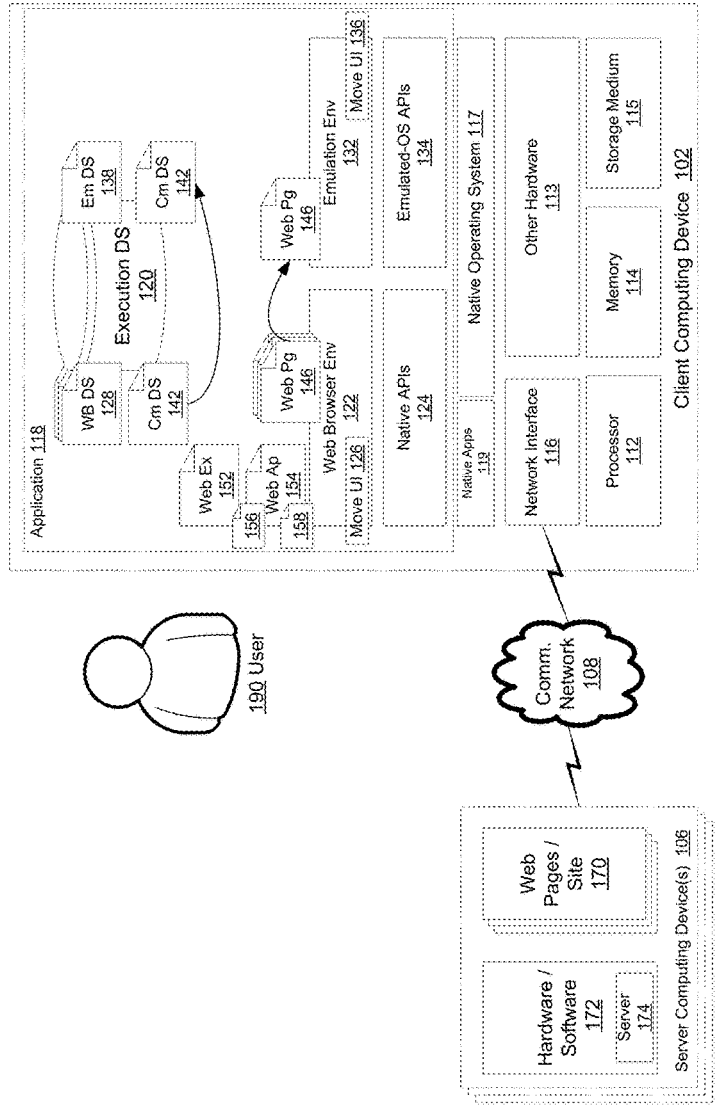
FIG. 1 is a block diagram of an example embodiment of a system in accordance with the disclosed subject matter.

FIG. 1 is a block diagram of an example embodiment of a system 100 in accordance with the disclosed subject matter. In one embodiment, the system 100 may include a computing device (e.g., a client computing device) 102. In some embodiments, the computing device 102 may be operated by a user 190. In various embodiments, the system 100 may also include a server computing device 106. In the illustrated embodiment, the computing device 102 and the server computing device 106 may be in communication via a communication network 108 (e.g., the Internet, an intranet, a combination thereof, etc.).

In various embodiments, the client computing device 102 may include a computing device, such as, for example, a shared computing terminal, a desktop personal computer, a laptop, a netbook, a tablet, a smartphone, etc. or a virtual machine thereof. In various embodiments, the computing device 102 may be used by a user 190. In various embodiments, the computing device 102 may include a processor 112 configured to execute one or more machine executable instructions or pieces of software, firmware, or a combination thereof. The computing device 102 may include, in some embodiments, a memory 114 configured to store one or more pieces of data, either temporarily, permanently, semi-permanently, or a combination thereof. Further, the memory 114 may include volatile memory, non-volatile memory or a combination thereof. In various embodiments, the computing device 102 may include a storage medium 115 configured to store data in a semi-permanent or substantially permanent form. In various embodiments, the storage medium 115 may be included by the memory 114.

In various embodiments, the computing device 102 may include one or more network interfaces 116 configured to allow the computing device 102 to be part of and communicate via a communications network 108. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the computing device 102 may include one or more other hardware components 113 (e.g., a display or monitor, a keyboard, a mouse, a camera, a fingerprint reader, a video processor, etc.). It is understood that the above are merely a few illustrative examples to which the disclosed subject matter is not limited.

In various embodiments, the computing device 102 may include a native operating system (OS) 117 configured to provide one or more services to an application 118 (e.g., a web browser, an operating system emulator, etc.) and manage or act as an intermediary between the application and the various hardware components (e.g., the processor 112, a network interface 116, etc.) of the computing device 102. In such an embodiment, the computing device 102 may include one or more applications 118, which may be installed locally (e.g., within the storage medium 115, etc.) and configured to be executed directly by the processor 112 and directly interact with the OS 117. Such applications may be referred to as native applications. In such an embodiment, the native applications may include pre-compiled machine executable code. In some embodiments, the native applications may include a script interpreter (e.g., C shell (csh), AppleScript, AutoHotkey, etc.) or a virtual machine (e.g., the Java Virtual Machine, the Microsoft Common Language Runtime, etc.) that are configured to translate source or object code into executable code which is then executed by the processor 112.

In one embodiment, the OS 117 may allow the application 118 access to various system resources (e.g., access to the storage medium 115, access to a camera, access to a location sensor, draw a user interface (UI) on a display/monitor, etc.) to perform various application functions (e.g., contact a web site, take a picture, read/write a file, etc.).

In some embodiments, the computing device 102 may include a web browser or web browser-like application 118 configured to access a web site or a collection of web pages, scripts, etc. from a physically remote server or web server (e.g., servers 106, etc.).

In various embodiments, the web browser 118 may include or be configured to interact with one or more web extensions 152. In this context, a "web extension 152" may include one or more web pages packaged or grouped together as a definable whole, and configured to add functionality to the web browser 118. In one embodiment, a web extension 152 may add functionality by altering the way a web page 146 or web site 170 is displayed or rendered by the web browser 118 (e.g., by blocking advertisements, adding hyperlinks, etc.). In another embodiment, the web extension 152 may add functionality by communicating with a server (e.g., server computing device 106) and updating or altering the user interface (UI) of the web browser 118 (e.g., placing or changing an icon in the web browser's 118 toolbar, etc.). It is understood that the above are merely a few illustrative examples to which the disclosed subject matter is not limited.

In this context, a "web page" includes a file or document which is a portion of a web site. In various embodiments, such web pages may include a file formatted as Hypertext Markup Language (HTML), Cascading Style Sheets (CSS), JavaScript, Extensible Markup Language (XML) such as a XHTML (Extensible HyperText Markup Language) file, an Adobe Flash file, images, videos, etc. In various embodiments, the web browser application 118 may process one or more web pages in order to render one web page. For example, an HTML web page may be modified or include other web pages, such as, JavaScripts, a CSS file, various images, etc. It is understood that the above is merely one illustrative example to which the disclosed subject matter is not limited.

In this context, a "web site" may include a collection or grouping of related web pages that are generally viewable or understandable (once rendered by the web browser 118) to the user 190. In various embodiments, when a web site (e.g., web site 170) is accessed via a communications network, the web site may be accessed via the Hypertext Transfer Protocol (HTTP) or Hypertext Transfer Protocol Secure (HTTPS). It is understood that the above is merely one illustrative example to which the disclosed subject matter is not limited.

In various embodiments, the web browser 118 may include or be associated with one or more web applications 154. In this context, a "web application" may include a manifest 156 and at least a portion of a web site 158 which itself includes web pages (e.g., web page 146). In this context, a "web application" may be configured to help a user 190, via the web site 158 of the web application 154, complete a single task or multiple tasks. In such an embodiment, the web application 154 may be configured to be executed or interpreted by the web browser 118. This is compared with the native applications 118 that include machine executable code and are configured to be executed directly by the processor 112 or via the operating system 117. Whereas, a web application 154 may be incapable of execution or display without the aid of the web browser 118.

In the illustrated embodiment, the web application 154 may be packaged as an installable entity. In this context, "installation" includes the act of placing semi-permanently or substantially permanently one or more files (e.g., manifest 156, web site portion 158, etc.) on the computing device 102 for later execution or processing.

In such an embodiment, the user 190, via the web browser 118, may contact a web application store server which includes or provides a web store (not shown). In various embodiments, the web store may include one or more web applications for download and installation. Each of these web applications may be packaged as an installable entity in a predetermined format (e.g., Chrome Extension format (CRX), ZIP format, etc.).

In various embodiments, the user 190 may select a web application (e.g., web application 154) to download and locally install on the computing device 102. In such an embodiment, the web browser 118 may download the web application 154 and either store it locally in the packaged format, or un-package or decompress the web application into a predetermined location (e.g., a web application portion of a file system in the storage medium 115, etc.).

In the illustrated embodiment, the application 118 may be configured to provide or present web pages 146 using two or more modes. In one embodiment, the first or preferred mode may include a web browser presentation environment 122. In such an embodiment, the application 118 may load or present web pages 146 (e.g., HTML pages, portions of a web application 154, a web extension 152 or portion thereof, etc.) as if the application 118 were a standard web browser executing within the OS 117. In such an embodiment, the application 118 may display a window or other set of user interface (UI) elements according the dictates of the native OS 117 (e.g., a menu bar at the top of the screen in Apple's OS X, a title bar in Microsoft Windows, etc.) and generally be substantially indistinguishable or similar from other native apps 119 that share a common "look-and-feel" associated with the native OS 117. An example embodiment of the application 118's web browser mode and the web browser presentation environment 122 are shown by window 291 of FIGS. 2*a* and 2*b*, as described below.

In this context, the phrase "presenting a web page" and its variants includes the reading of one or more web pages 146 and the data structures defined therein (e.g., HTML, Document Object Model (DOM) tree, scripts, etc.) and performing a series of commands or actions based upon the data structure of the web page 146. In the simplest example presenting a static HTML web page may include rendering or formatting the data structure (e.g., text elements, form elements, etc.) and displaying the formatted data structure to the user 190 or via the UI (e.g., window, tab, etc.) of the application 118. In some embodiments, a series of commands found within a script or other portion of a web page 146 may be presented or performed by the application 118. In yet another embodiment, the presentation of a web page 146 may include the retrieval, loading, or presentation of other web pages 146 (e.g., pictures, videos, executable code, such as a Flash executable, etc.). It is understood that the above are merely a few illustrative examples to which the disclosed subject matter is not limited.

In the illustrated embodiment, the user 190 may wish to access or present a web page 146 within the web browser presentation environment 122. In various embodiments, this web page 146 may be retrieved from the web site 170, the web application 154, or the web extension 152.

In the illustrated embodiment, the server computing device 106 may include one or more hardware and/or software components 172 analogous to those described in relation to computing device 102. In various embodiments, the server computing device 106 may include a computing device, such as, for example, a rack-mounted server, a blade server, a desktop personal computer, etc. or a virtual machine thereof. In some embodiments, the server computing device 106 may include a web page or file server 174 configured to provide files or web pages 170 upon request to another computing device (e.g., client 102, etc.)

In various embodiments, the presentation of the web page 146 may include creating one or more presentation data structures (DSs) 120. In various embodiments, these data structures may include a number of variables or fields that include various values. The data structures may include information derived from the web page 146 (e.g., a file name, a web page title, cached video or audio, a DOM tree, etc.) The data structures may include data created by the user 190 or in response to actions performed by the user 190 (e.g., writing in a text field, clicking a UI element displayed on the page, etc.). The data structures may include data generated by the application 118 or native OS 117 and merely associated with the web page 146 (e.g., a list of open web pages in which web page 146 has an entry, a decompressed version of a compressed image, configuration settings, etc.). It is understood that the above are merely a few illustrative examples to which the disclosed subject matter is not limited.

In the illustrated embodiment, these DSs may be grouped into two general categories: presentation environment specific DSs or DS portions (e.g., web browser presentation environment data structures 128, emulation-based presentation environment DSs 138, etc.), and common or non-presentation environment specific DSs or DS portions 142. In one embodiment, the presentation environment specific DSs may include information, variables, or data about or associated with the web page 146 that is specific to the presentation environment in which the web page is being presented (e.g., a list of open web pages in which web page 146 has an entry, a decompressed version of a compressed image, configuration settings, a DOM tree derived from the web page 146 but altered by a configuration setting or web extension 152, etc.). Conversely, the common DSs 142 may include information, variables or data about the web page 146 that is not specific to the presentation environment in which the web page is being presented (e.g., data entered into a text field, the state of a state machine created by a script associated with the web page 146, a compressed image associated with the web page 146, etc.). It is understood that the above are merely a few illustrative examples to which the disclosed subject matter is not limited.

At some point the user 190, for whatever reason, may wish to change the presentation environment in which the web page 146 is being presented. In the illustrated embodiment, the application 118 may be configured to accommodate or present web pages 146 in one of two modes or environments. In other embodiments, other presentation environments may be included by the application 118.

Figure 2A:
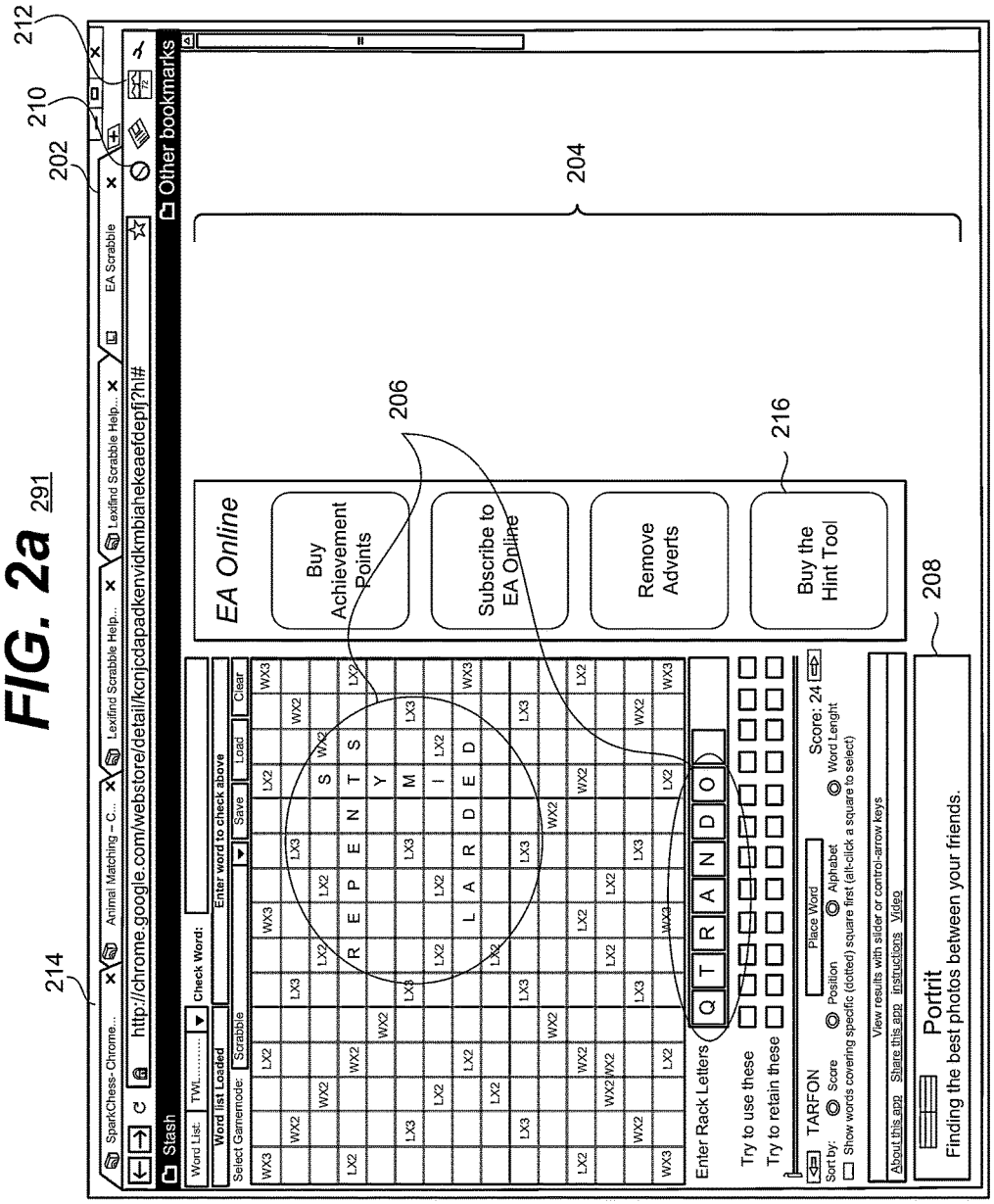
FIG. 2a is a diagram of an example embodiment of a user interface in accordance with the disclosed subject matter.

As described above, one presentation mode or environment may include the web browser environment 122 in which the web page 146 is displayed in a window substantially similar to a traditional web browser (e.g., the window 291 of FIGS. 2a and 2b, etc.). In another embodiment, the application 118 may be configured to also present an emulation-based presentation environment 132 (e.g., UI 293 of FIG. 2c, etc.).

In such an embodiment, the emulation-based presentation environment 132 may be configured to simulate or attempt to simulate a presentation environment dissimilar to the presentation environment provided by the native OS 117. For example, while the web browser presentation environment 122 may be configured to present the web page 146 within the presentation environment of a Chrome web browser running within the Apple OS X operating system 117, the emulation-based presentation environment 132 may strive to present the web page 146 as if it was being presented within the Google Chrome OS, or, in another embodiment, the Google Chrome browser running within the Android OS. It is understood that the above is merely one illustrative example to which the disclosed subject matter is not limited. In various embodiments, the emulation-based presentation environment 132 may also be described as an emulated-OS based presentation environment.

In the illustrated embodiment, the emulation-based presentation environment 132 may emulate or execute an operating system or environment that is different from the native OS 117. For example, in one embodiment, the emulation-based presentation environment 132 may present web pages 146 as if they were being presented by a the Google Chrome OS, whereas the native operating system 117 may be a Microsoft Windows 8 OS or other environment. As described above, in such an embodiment, the web browser presentation environment 122 may present the web page 146 according to the dictates of the Microsoft Windows 8 OS 117, but when presenting the web page 146 within the emulation-based presentation environment 132 the web page 146 may be presented in accordance with, not the native OS 117 dictates, but instead the dictates of the Google Chrome OS.

In various embodiments, unlike a virtual machine, the emulation-based presentation environment 132 may not be configured to attempt to emulate or virtualize various hardware components, but may instead attempt to emulate how the emulated-OS may present a web page 146 on the actual or physical hardware of the computing device 102. In another embodiment, the emulation-based presentation environment 132 may be based upon a different processor architecture (e.g., ARM versus Intel's x86 architecture), a different operating system (e.g., a mobile phone OS, a tablet, OS, a different version of the native OS 117, etc.), different hardware, etc. It is understood that the above are merely a few illustrative examples to which the disclosed subject matter is not limited.

As described above, in various embodiments, the user 190 may wish to change the presentation environment in which the web page 146 is being presented. In such an embodiment, the user 190 may indicate this desire via a move user interface element 126 included within the web browser presentation environment 122. In some embodiments, this UI element 126 may include a button, an icon, a key command, a mouse action, a gesture, etc.). In various embodiments, the emulation-based presentation environment may include a similar move UI element 136.

In some embodiments, the web browser presentation environment 122 may cease or stop the presenting the web page 146. The application 118 may then be configured to copy or make available the common data structures over to the emulation-based presentation environment 132. In some embodiments, this may include simply making the emulation-based presentation environment 132 aware of the of the common data structures.

Further, in various embodiments, the web browser presentation environment 122 may remove, delete, or alter the web browser DSs 128. For example, the web page 146 may be removed from a list of active web pages displayed or presented by the web browser presentation environment 122, a tab or UI element displaying the web page 146 may be removed or deleted, the DOM tree of the web page 146 may be deleted, etc. It is understood that the above are merely a few illustrative examples to which the disclosed subject matter is not limited.

In one embodiment, once the emulation-based presentation environment 132 has gained control of the presentation of the web page 146 the emulation-based presentation environment DSs 138 may be created, generated, or altered. For example, the web page 146 may be added to a list of active web pages displayed or presented by the emulation-based presentation environment 132, a tab or UI element displaying the web page 146 may be created or displayed, the DOM tree of the web page 146 may be generated, compressed images associated with the web page 146 may be decompressed, etc. It is understood that the above are merely a few illustrative examples to which the disclosed subject matter is not limited.

In various embodiments, as the individual data structures employed by the emulation-based presentation environment 132 may not naturally be divided into emulation-based presentation environment DSs 138 and common DSs 142, information from the common DS portions 142 may be used to populate or placed within any DSs that straddle the presentation environment/common-based categorization employed by the patent application. For example, text entered by a user into a text field of the web page 146 may be considered part of the common DS portion 142 but may be stored within a mixed DS that includes the DOM tree derived from the web page 146 (considered part of the emulation-based presentation environment DS portion 138). However, in a preferred embodiment, the emulation-based presentation environment DS portion 138 and common DS portion 142 may be identifiable separate logical DSs. It is understood that the above are merely a few illustrative examples to which the disclosed subject matter is not limited.

In some embodiments, once the web page 146 and its associated data structures 138 and 142 have been moved to the emulation-based presentation environment 132 the web page 146 may be presented by the emulation-based presentation environment 132. In another embodiment, the presentation of the web page 146 may result in the creation of the emulation-based presentation environment DSs 138. The user 190 may then interact with the web page 146 via the emulation-based presentation environment 132. It is understood that the above is merely one illustrative example to which the disclosed subject matter is not limited.

It is understood that the above is merely one illustrative example to which the disclosed subject matter is not limited. In various embodiments, the transfer of the presentation responsibilities web page 146 and the common DS portions 142 may occur from the emulation-based presentation environment 132 to the web browser presentation environment 122 (or a third or other presentation environment if supported by the application 118). In various embodiments, this may allow the web page 146 to be seamlessly moved or transferred across the presentation environment boundary (between the web browser presentation environment 122 controlled by the native OS 117, and the emulation-based presentation environment 132). In such an embodiment, the web page 146 may continue to be worked on or with by the user 190 without the need to reboot or shutdown the computing device 102, and/or without losing unsaved data (e.g., text entered into a text field, the state of a video game, etc.).

The understanding of the concept may be aided at this point by a more visual example. FIG. 2a is a diagram of an example embodiment of a user interface (UI) 291 in accordance with the disclosed subject matter. In one embodiment, the user interface 291 may include a window UI that is displayed, amongst other windows, within a graphical user interface (GUI) of an operating system (see FIG. 2b).

In the illustrated embodiment, the UI 291 may include a window of a web browser. In such an embodiment, the web browser may be the graphical UI manifestation of a web browser presentation environment. Alternately, the web browser may provide or include the web browser presentation environment.

In one embodiment, the web browser may include a multi-tabbed user interface and may include a plurality of tabs 214. In such an embodiment, each tab 214 may include or display a web page (and its associated elements or web pages; e.g., images, etc.). In addition, in some embodiments, the web browser may also execute one or more web extensions (illustrated by icon 212). In various embodiments, one or more of these web extensions may include hidden web pages that are not displayed to the user (e.g., not included in the web pages associated with tabs 214).

In the illustrated embodiment, the tab 202 may include or be associated with web page 204. In some embodiments, the web page 204 may include a web application. In the illustrated embodiment, the web page 204 is a video game, specifically Scrabble. In such an embodiment, the web page 204 may include various graphical elements, such as, for example, an image representing the board of the game, images representing the user's "hand" or "rack" in the game, buttons via which the user may indicate moves or actions (e.g., play letters to form a word, etc.), etc.

In some embodiments, a portion of these UI elements may be considered to be part of a web-browser presentation environment. For example, the decompressed versions of the game board, action buttons, etc. may be items that are derived from the web page 204. For example, the displayed decompressed image of the game board may be created from a compressed version of the game board that is included by the web page. Such data structures may be considered part of the web-browser presentation environment as they are easily reconstructed based upon information included within the web page 204. Likewise the advertisement 208 may be considered a data structure that is part of the web-browser presentation environment as it may be considered a dynamic piece of data that is not pertinent or relevant to the state of the web page 204 of the scripts or executable code that maintains the game board and the player's moves thereof. Also, data that is merely associated with the web page 204, such as, for example that the window 291 is displaying or includes 5 tabs of which tab 202 is one may also be considered part of the web-browser presentation environment data structures. It is understood that the above are merely a few illustrative examples to which the disclosed subject matter is not limited.

However, data such as the state of the game board (represented by tiles 206) and the state of the player's "hand" or "rack" (also represented by tiles 206) may not be information that can be derived from the web page 204 or the document(s) that make up the web page 204 or information that is related to the web page management functions of the web-browser presentation environment (e.g., the list of tabs and their contents, etc.). In such an embodiment, the data represented by tiles 206 may be considered as included by the common data structures. It is understood that the above is merely one illustrative example to which the disclosed subject matter is not limited.

In the illustrated embodiment, the button or icon 210 may be the user interface element configured to allow a user to indicate that they wish to move or transfer the web page 204 from the web-browser presentation environment to an emulation-based presentation environment. Upon selecting this icon 210 the web page 204 may be moved between presentation environments, as described above.

FIG. 2*b* is a diagram of an example embodiment of a user interface 292 in accordance with the disclosed subject matter. In the illustrated embodiment, the window 291 is shown within the broader context of the native OS. In various embodiments, the UI 292 may include a desktop or screen of the native OS. In some embodiments, the native OS may support multiple virtual screens or virtual desktops, of which UI 292 may be only one. In some embodiments, a virtual desktop may include a user interface in which the virtual space of a computer's desktop or screen environment is expanded beyond the physical limits of the screen's display area through the use of software. In various embodiments, of virtual desktops may be seen in Apple's OS X "Spaces" feature or UNIX's X Window system; although, it is understood that the above are merely a few illustrative examples to which the disclosed subject matter is not limited.

In the illustrated embodiment, the native OS may include a taskbar 225 at the bottom of the UI 292 that includes a menu 223 and a number of icons 224 representing various applications or programs that may be executed. In various embodiments, the web browser that creates window 291 may be included in the list of icons 224. The native OS desktop 292 may also include one or more icons 226 positioned outside the taskbar 225. In various embodiments, these icons may perform or facilitate the performance of one or more actions by the native OS (e.g., file system management, deletion of files, launch applications, etc.). It is understood that the above is merely one illustrative example to which the disclosed subject matter is not limited.

As described above, the web browser window 291 may be the visual manifestation of the web-browser presentation environment and may appear to a user as just a regular web browser. As described above, the web page 204 may be displayed within a tab of the web browser window 291 as a user would normally expect. Also, in various embodiments, other windows 222, created by other applications or other windows created by the web-browser presentation environment may be displayed on the native OS desktop or UI 292.

As described above, once the user selects the move UI element or otherwise indicates that they wish present the web page 204 in the emulation-based presentation environment, the web page 204 and its associated common data, or a portion thereof, may be moved or transferred to the desired OS-based presentation environment.

Figure 2C:
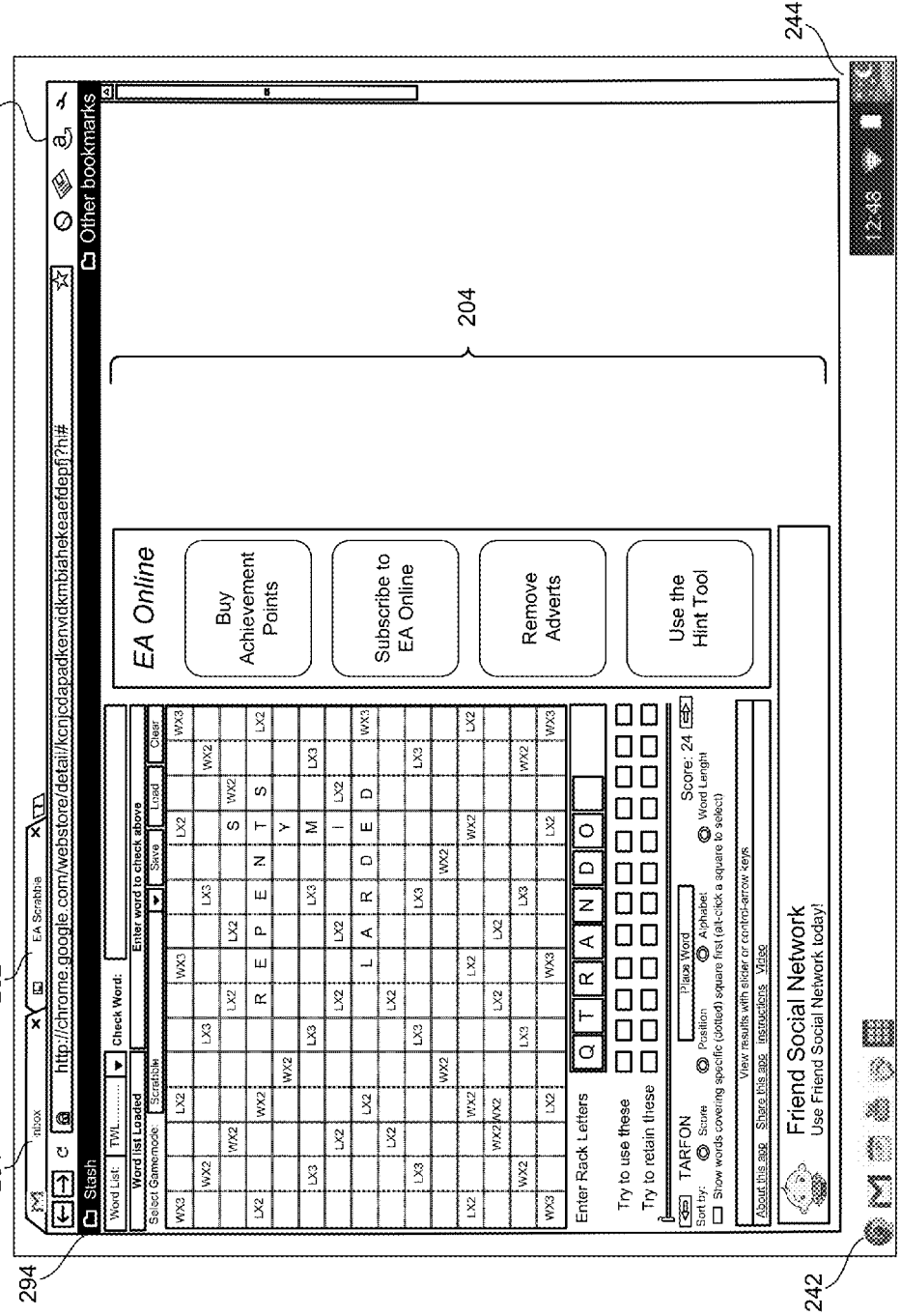
FIG. 2c is a diagram of an example embodiment of a user interface in accordance with the disclosed subject matter.

FIG. 2*c* is a diagram of an example embodiment of a user interface 293 in accordance with the disclosed subject matter. In the illustrated embodiment, the UI 293 may include the visual manifestation of the emulation-based presentation environment, as described above. More specifically, in the illustrated embodiment, the emulation-based presentation environment may be emulating the Chrome OS. In some embodiments, the application may be capable of actually running the Chrome OS on top of or within the native OS.

In various embodiments, the UI 293 may consume or take-up the entire screen or monitor of the displaying computer device, similarly to the UI 292 of the native OS. In such an embodiment, the native OS may be hidden or not displayed to the user when in the emulation-base presentation environment. It is understood that the above is merely one illustrative example to which the disclosed subject matter is not limited.

In the illustrated embodiment, the emulation-based presentation environment UI 293 may include, at the bottom left of the UI 293, a number of icons 242 representing various web applications or web pages that may be presented. The emulation-based presentation environment UI 293 may also include one or more status icons 244 (e.g., weather, battery charge, wireless connectivity, time, etc.) positioned at the bottom right of the screen. In various embodiments, these icons may perform or facilitate the performance of one or more actions by associated with hardware devices (virtual or physical) controlled by the emulation-based presentation environment. It is understood that the above is merely one illustrative example to which the disclosed subject matter is not limited.

In the illustrated embodiment, the emulation-based presentation environment may include an presentation environment in which windows are generally eschewed or avoided. In such an embodiment, the emulation-based presentation environment or the OS the emulation-based presentation environment is emulating may be configured to only present web pages or web applications. In such an embodiment, each visible web page may be associated with or displayed within a tab (e.g., tab 264, tab 262, etc.). In some embodiments, these tabs may be grouped or contained within the UI element 294. In some embodiments, the UI element 294 may be considered the only window of the OS emulated by the emulation-based presentation environment. It is understood that the above is merely one illustrative example to which the disclosed subject matter is not limited.

As described above, once the web page 204 has been transferred to the emulation-based presentation environment the emulation-based presentation environment may begin to present the web page 204. The presentation of the web page 204 is further described below in relation to FIG. 2*d*.

In the illustrated embodiment, the emulation-based presentation environment UI 293 is described and shown as taking up an entire screen or display. In one such embodiment, once the user transfers the web page 204 to the emulation-based presentation environment, the emulation-based presentation environment UI 293 may be displayed and enter a full-screen mode, hiding the native OS UI (e.g., UI 292, etc.). The native OS UI may remain hidden until the user moves a web page (e.g., web page 204) back to the web browser presentation environment, or selects another action that minimizes the UI 293 or un-hides the native OS UI.

In another embodiment, the emulation-based presentation environment UI 293 may be displayed within a virtual screen or desktop of the native OS UI, and may be switched in and out of via various UI mechanisms (e.g., key commands, buttons, menu items, etc.). In yet another embodiment, the emulation-based presentation environment UI 293 may be displayed within a window of the native OS UI. In such an embodiment, the emulation-based presentation environment UI 293 may be graphically similar to a guest virtual machine running or executing on a host OS. However, it is understood that a virtual machine does not include the capability to seamlessly transfer web pages or web applications between multiple presentation environments. It is understood that the above are merely a few illustrative examples to which the disclosed subject matter is not limited.

FIG. 2*d* is a diagram of an example embodiment of a user interface element 294 in accordance with the disclosed subject matter. In one embodiment, the UI element 294 may include a container for the tabs (e.g., tab 264, tab 262, etc.) of the emulation-based presentation environment, as described above. In one embodiment, the web page 204 may have been moved or transferred to the emulation-based presentation environment, as described above.

In the illustrated embodiment, the emulation-based presentation environment may include a different web extensions (illustrated by icon 272) than the web browser presentation environment. Further, the emulation-based presentation environment may include a different number of tabs and those tabs (aside from the web page 204) may include different web pages than the web browser presentation environment. For example, if FIG. 2a the web browser presentation environment was shown as including 4 tabs (besides tab 202 that includes web page 204), whereas the emulation-based presentation environment of FIG. 2d includes 1 tab (tab 264). In various embodiments, other differences between the emulation-based presentation environment and the web based presentation environment, and the web pages they are presenting may occur. It is understood that the above are merely a few illustrative examples to which the disclosed subject matter is not limited.

As described above, in various embodiments, once the web page 204 is moved or transferred over to the control of the emulation-based presentation environment, the emulation-based presentation environment may begin presenting the web page 204. As described above, In some embodiments, this may include creating or generating various emulation-based presentation environment DSs, such as, adding the tab 262 (which includes the web page 204) into a list of tabs being presented by the emulation-based presentation environment, reading the web page 204, decompressing compressed images that are included with or associated with the web page 204 (e.g., the image of the game board, etc.), deciding which images or portions of the web page 204 to display, etc. It is understood that the above are merely a few illustrative examples to which the disclosed subject matter is not limited.

As described above, the common data structures may be copied or moved to the emulation-based presentation environment. In some embodiments, the common DSs may simply be placed under the control of the emulation-based presentation environment. As described above, in the illustrated embodiment, the common data structures may include information regarding the state of the game board and the status of the players "rack" or "hand" (illustrated by tiles 206). In various embodiments, these common DSs may be used or employed to restore the web page 204 to the same or substantially similar state as it was under the web browser presentation environment.

However, in various embodiments, the display or the state of the web page 204 may be different between the two presentation environments. For example, in one embodiment, the emulation-based presentation environment may be associated with the purchase of a hint tool or other feature or, more generally, one or more settings or configuration options may differ between the two presentation environments. As such, in the illustrated embodiment, when the web page 204 is displayed or presented within the emulation-based presentation environment the button 266 asking is the user wishes to "Use the Hint Tool" is displayed instead of the button 216 of FIG. 2a that asked if the user wished to "Buy the Hint Tool". It is understood that the above is merely one illustrative example to which the disclosed subject matter is not limited.

In another embodiment, some data or associated web pages may not be moved or transferred across the presentation environment boundary. For example, the advert 208 of FIG. 2a may not have been included in the common DSs as it is a dynamic element that is relatively independent of the web page 204 and the state of the video game included by the web page 204. As described above, the advert 208 of FIG. 2a may be considered part of the web browser presentation environment and not moved or transferred to the emulation-based presentation environment. In such an embodiment, while presenting the web page 204 the emulation-based presentation environment come upon an HTML element that indicates the advert or subordinate web page that includes the advert 268 is needed. The emulation-based presentation environment may then access the advert 268 (e.g., download the advert 268 from a respective web server, etc.) and display it accordingly. It is understood that the above is merely one illustrative example to which the disclosed subject matter is not limited.

As described above, the UI 294 may include a move UI element 270 (e.g., button, icon, menu item, key command, etc.) that allows a user to indicate that the user wishes to move a given web page (e.g., web page 204) to the web browser presentation environment or other presentation environment if the system includes such presentation environments. In such an embodiment, the process of moving a web page or the presentation of the web page from the emulation-based presentation environment to the web browser presentation environment may be the reverse of that described above.

Returning to FIG. 1, in one embodiment, the web browser presentation environment 122 may be relatively (compared to the emulation-based presentation environment 132) tightly coupled with or work in conjunction with the native OS 117. In such an embodiment, the native OS 117 may include or provide a plurality of native application programmable interfaces (APIs) 124. In various embodiments, in which the web browser presentation environment 122 supports integration with the native OS 117, the web browser presentation environment 122 may include or expose the web page 146 to the native APIs 124. In such an embodiment, the web page 146, when being presented by the web browser presentation environment 122 the web page 146 may be able to make use of or call the set of machine executable instructions included by the native APIs 124. In various embodiments, this may allow the web page 146 to appear to be more tightly integrated with the native OS 117.

For example, modern Operating Systems often use a notification center to display timely information to the user (e.g., calendar appointments, incoming text messages, etc.). Generally these notification center messages take two basic forms: speech balloons, or banners; although, the look-and-feel of the notification messages differs between Operating Systems. In one embodiment, if the web page 146 wishes to display a notification to the user 190, the web page 146 may call the native API function, subroutine, or programmatic method that causes notifications to appear in the native OS 117.

However, in one embodiment, the emulation-based presentation environment 132 may not include or provide the native APIs 124. As one of the features or benefits of the emulation-based presentation environment 132 is that it emulates, at least in part, an OS different from that of the native OS 117, the emulation-based presentation environment 132 may provide a different set of APIs. In such an embodiment, the emulation-based presentation environment 132 may include or provide an emulation-based presentation environment or emulated-OS APIs 134. In some embodiments, these APIs 134 may be the APIs, or a sub-set thereof, of the APIs that would be expected or associated with the OS the emulation-based presentation environment 132 is attempting to emulate or virtualize.

In such an embodiment, when the web page 146 is being presented by the emulation-based presentation environment 132 and the web page 146 requests that a message be posted to the notification center, the native APIs 124 would not be used, but instead the emulation-based presentation environment APIs 134 would be used or presented.

In one embodiment, if the web page 146 is being presented by the web browser presentation environment 122, the notification message may be generated by the native OS 117 (via the native APIs 124) and, in one embodiment, may result in a banner-style notification message in the OS's taskbar (e.g., taskbar 225 of FIG. 2b, etc.). Conversely, if the web page 146 is being presented by the emulation-based presentation environment 132, the notification message may be generated using the UI generated by the emulation-based presentation environment 132 (via the emulation-based presentation environment APIs 134) and, in one embodiment, may result in a balloon-style notification message (e.g., near the status icons 244 of FIG. 2c, etc.). In various embodiments, other actions other than notification messages may differ between the presentation environments 122 and 132. It is understood that the above is merely one illustrative example to which the disclosed subject matter is not limited.

Alternately, the emulation-based presentation environment 132 and the emulation-based presentation environment APIs 134 may support features or hardware devices not supported by the native OS 117. In one embodiment, the emulation-based presentation environment 132 may support a different file system structure or form of storage than the native OS 117, such that the emulation-based presentation environment 132 and the web page 146 may access a different hard drive or storage medium 115 than the native OS 117.

For example, the native OS 117 and web browser presentation environment 122 may support a first file system structure (e.g., NTFS (New Technology File System), Hierarchical File System Plus (HFS+), etc.) while the emulation-based presentation environment 132 may support a second file system structure (e.g., File Allocation Table (FAT), Third Extended file system (ext3), etc.). In another embodiment, the native OS 117 and web browser presentation environment 122 may support a first file system or partition (e.g., a first hard drive or first hard drive partition, etc.) while the emulation-based presentation environment 132 may support a second file system or partition (e.g., a second hard drive, a second hard drive partition, a file stored on the first hard drive partition but treated by the emulation-based presentation environment 132 as a separate file system, etc.) It is understood that the above are merely a few illustrative examples to which the disclosed subject matter is not limited.

In various embodiments, when the presentation of the web page 146 is transferred or moved between presentation environments 122 or 132, the web page 146 may be notified of the change in presentation environment. In such an embodiment, in response to the indication that a change in presentation environment has occurred, the web page 146 may re-initialize a portion of its data structures. For example, the web page 146 may rediscover what API subroutines are supported in the new presentation environment. In various embodiments, this re-initialization of the web page 146's data structures may occur as part of the transfer process conducted by the receiving presentation environment. It is understood that the above are merely a few illustrative examples to which the disclosed subject matter is not limited.

In various embodiments, the way in which a web page 146 is presented may depend, at least in part, upon the person who is logged into the presentation environment. In this context, the term "profile" includes one or more settings associated with a set of authentication credentials (e.g., username/password pair, etc.) that alters the way an presentation environment behaves. In such an embodiment, a web page 146 may be presented a first way if the presentation environment is associated or operating under a first profile and the web page 146 may be presented a second way if the presentation environment is associated or operating under a second profile. To return to the video game example of FIGS. 2a, 2b, 2c, and 2d each profile may be associated with a different difficulty level, high scores, friends, etc. It is understood that the above is merely one illustrative example to which the disclosed subject matter is not limited.

In various embodiments, the web browser presentation environment 122 may be associated with or presenting under a first profile and the OS-base presentation environment 132 may be presenting under a second profile. To return to the video game example, when presenting under the web browser presentation environment 122 and the first profile the web page 146 may make use of a first difficulty level, a first set of high scores, a first list of friends, etc. Whereas, presenting under the emulation-based presentation environment 132 and the second profile the web page 146 may make use of a second difficulty level, a second set of high scores, a second list of friends, etc. It is understood that the above is merely one illustrative example to which the disclosed subject matter is not limited.

FIG. 3 is a flowchart of an example embodiment of a technique 300 in accordance with the disclosed subject matter. In various embodiments, the technique 300 may be used or produced by the systems such as those of FIG. 1 or 4. Furthermore, portions of technique 300 may be used or produce UIs such as that of FIGS. 2a, 2b, 2c, and/or 2d. Although, it is understood that the above are merely a few illustrative examples to which the disclosed subject matter is not limited. It is understood that the disclosed subject matter is not limited to the ordering of or number of actions illustrated by technique 300.

Block 302 illustrates that in one embodiment, a processor of a computing device may execute a web browser presentation environment, as described above. In various embodiments, one or more of the action(s) illustrated by this Block may be performed by the apparatuses or systems of FIG. 1 or 4, the computing device 102 or application 118 of FIG. 1, as described above.

Block 304 illustrates that in one embodiment, at least one web page may be presented within a context of the web browser presentation environment, as described above. In various embodiments, presenting within the web browser presentation environment may include maintaining a first presentation data structure that includes a web browser presentation data structure portion and a common presentation data structure portion, as described above. In one embodiment, the web browser presentation environment may include a presentation environment created by a web browser software application executed within a native operating system environment, as described above. In various embodiments, one or more of the action(s) illustrated by this Block may be performed by the apparatuses or systems of FIG. 1 or 4, the application 118 or the web browser presentation environment 122 of FIG. 1, as described above.

Block 306 illustrates that in one embodiment, a request to move the presentation of the web page from the web browser presentation environment to an emulation-based presentation environment may be received. In one embodiment, the emulation-based presentation environment may include an presentation environment created by a non-native operating system emulation software application executed within the native operating system environment. In one embodiment, presenting the web page within the emulation-based presentation environment may include hiding a native operating system user interface of the native operating system environment from a user; displaying, to the user, a non-native operating system user interface based upon the non-native operating system; and displaying the web page within the non-native operating system user interface. In one such embodiment, the native operating system user interface includes a plurality of virtual desktops; and a first virtual desktop of the plurality of virtual desktops may be configured to display the non-native operating system user interface, and a second virtual desktop of the plurality of virtual desktops may be configured to display a user interface of the web browser software application.

In some embodiments, the web browser presentation environment may include a user interface element and receiving the request to move the presentation of the web page may include detecting that a user has selected the user interface element. In another embodiment, receiving the request to move the presentation of the web page may include detecting a configuration setting associated with the web page that indicates that the web page is to be presented within the emulation-based presentation environment. In various embodiments, one or more of the action(s) illustrated by this Block may be performed by the apparatuses or systems of FIG. 1 or 4, the application 118 or the web browser presentation environment 122 or the emulation presentation environment 132 of FIG. 1, as described above.

Block 308 illustrates that in one embodiment, the presentation of the web page may be moved from the web browser presentation environment to the emulation-based presentation environment. In one embodiment, moving or presenting within the emulation presentation environment may include maintaining a second presentation data structure that includes an emulation-based presentation data structure portion and the common data structure portion.

In various embodiments, presenting the web page within the web browser presentation environment may include providing the web page with access to a first file system but not providing the web page with access to a second file system, and presenting the web page within the emulation-based presentation environment may include providing the web page with access to the second file system but not providing the web page with access to the first file system. In another embodiment, presenting the web page within the web browser presentation environment may include executing the web page based, at least in part, upon a group of settings included within a first user profile, and presenting the web page within the emulation-based presentation environment may include executing the web page based, at least in part, upon a group of settings included within a second user profile. In yet another embodiment, the web browser presentation environment may include a first set of machine executable instructions that are callable by the web page, and the emulation-based presentation environment may include a second set of machine executable instructions that are callable by the web page.

In some embodiments, presenting the web page within the emulation-based presentation environment may include detecting that the web page was previously presented within the web browser presentation environment, and indicating to the web page that the web page has switched between presentation environments. In various embodiments, presenting the web page within the emulation-based presentation environment may include detecting that the web page was previously presented within the web browser presentation environment, and creating emulation-based presentation data structure portion. In various embodiments, one or more of the action(s) illustrated by this Block may be performed by the apparatuses or systems of FIG. 1 or 4, the application 118 or the web browser presentation environment 122 or the emulation presentation environment 132 of FIG. 1, as described above.

Block 322 illustrates that in one embodiment, a request to present a second web page may be received by the native operating system environment. Block 324 illustrates that in one embodiment, an association between the second web page and either the web browser presentation environment or the emulation-based presentation environment may be determined. Block 326 illustrates that in one embodiment, the second web page may be presented, based upon the association, via either the web browser presentation environment or the emulation-based presentation environment. In various embodiments, one or more of the action(s) illustrated by these Blocks may be performed by the apparatuses or systems of FIG. 1 or 4, the application 118 or the web browser presentation environment 122 or the emulation presentation environment 132 of FIG. 1, as described above.

Block 332 illustrates that in one embodiment, a second request to move the presentation of the web page from the emulation-based presentation environment to the web browser presentation environment may be received. Block 334 illustrates that in one embodiment, the presentation of the web page within the emulation-based presentation environment may be stopped. Block 336 illustrates that in one embodiment, the web page may be presented within the web browser presentation environment. In various embodiments, one or more of the action(s) illustrated by these Blocks may be performed by the apparatuses or systems of FIG. 1 or 4, the application 118 or the web browser presentation environment 122 or the emulation presentation environment 132 of FIG. 1, as described above.

Figure 4:
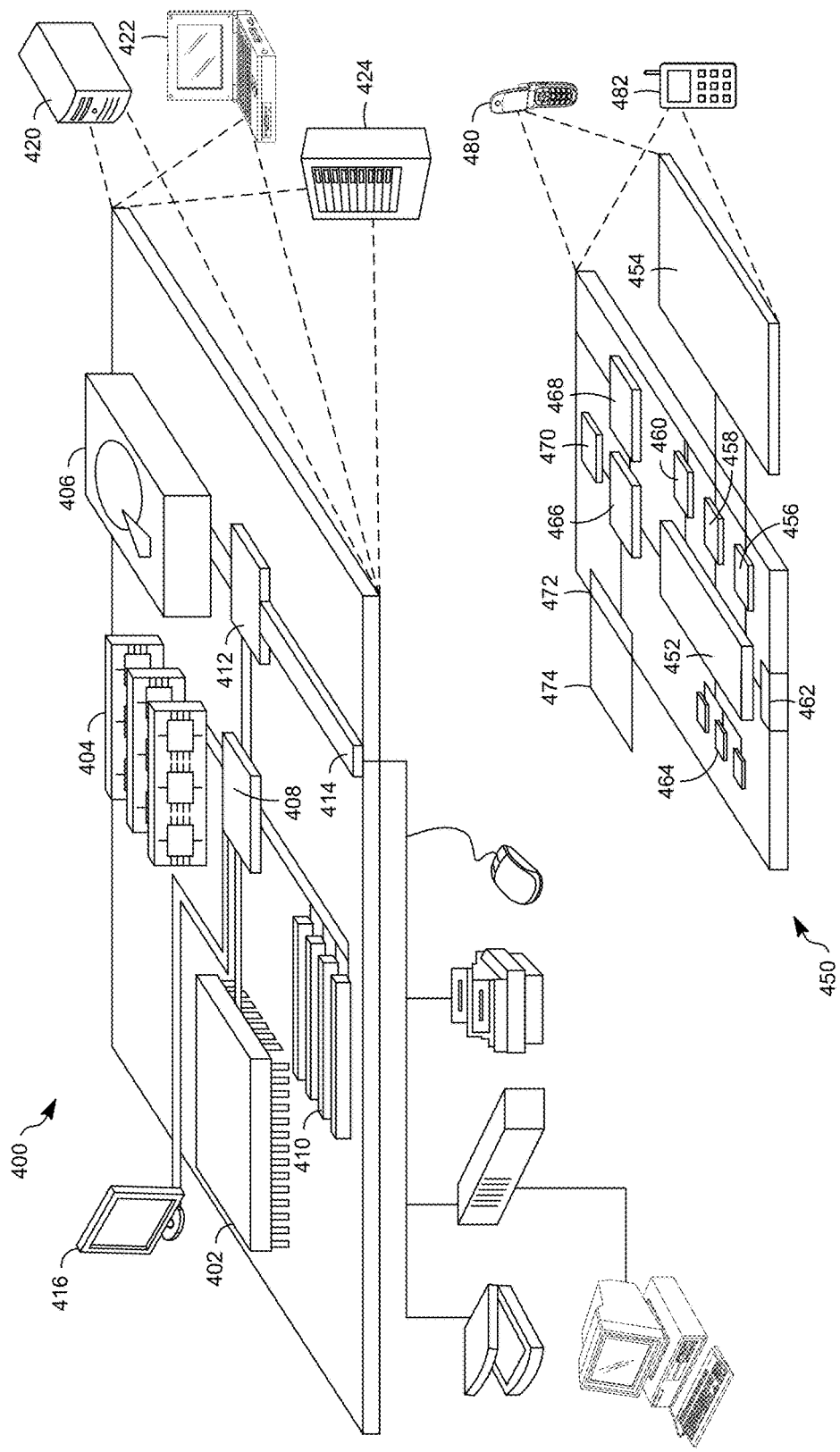
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:

executing, by a processor of a computing device, a web browser presentation environment, wherein the web browser presentation environment includes a presentation environment created by a web browser software application executed within a native operating system environment;

presenting on the computing device at least one web page that includes markup language content within a context of the web browser presentation environment, wherein presenting the at least one web page within the web browser presentation environment includes rendering the at least one web page according to the markup language content and maintaining a first presentation data structure that includes a web browser presentation data structure portion and a common presentation data structure portion;

receiving, by the processor of the computing device, while the web page is being presented in the web browser presentation environment, a request to move the presentation of the web page that includes markup language content from the web browser presentation environment to an emulation-based presentation environment, wherein the emulation-based presentation environment includes a presentation environment created by a non-native operating system emulation software application executed within the native operating system environment; and in response to receiving the request, moving, by the processor of the computing device, the presentation of the web page that includes markup language content from the web browser presentation environment to the emulation-based presentation environment, such that the web page is presented on the computing device within the context of the emulation-based presentation environment, wherein the moving includes rendering the at least one web page according to the markup language content and maintaining a second presentation data structure that includes an emulation-based presentation data structure portion and the common data structure portion, wherein the emulation-based presentation data structure portion is specific to the emulation-based presentation environment, and wherein the common data structure portion is not specific to either the web browser presentation environment or to the emulation-based presentation environment.

2. The method of claim 1, further including:

receiving, while the web page is being presented in the emulation-based presentation environment, a second request to move the presentation of the web page from the emulation-based presentation environment to the web browser presentation environment;

in response to receiving the second request, stopping the presentation of the web page within the emulation-based presentation environment; and presenting the web page within the web browser presentation environment.

3. The method of claim 1, wherein presenting the web page within the emulation-based presentation environment includes:

hiding a native operating system user interface of the native operating system environment from a user;

displaying, to the user, a non-native operating system user interface based upon the non-native operating system; and displaying the web page within the non-native operating system user interface.

4. The method of claim 3, wherein the native operating system user interface includes a plurality of virtual desktops; and wherein a first virtual desktop of the plurality of virtual desktops displays the non-native operating system user interface, and wherein a second virtual desktop of the plurality of virtual desktops displays a user interface of the web browser software application.

5. The method of claim 1, further comprising:

receiving, by the native operating system environment, a request to present a second web page;

determining an association between the second web page and either the web browser presentation environment or the emulation-based presentation environment; and presenting the second web page, based upon the association, via either the web browser presentation environment or the emulation-based presentation environment.

6. The method of claim 1, wherein the web browser presentation environment includes a user interface element; and wherein receiving the request to move the presentation of the web page includes detecting that a user has selected the user interface element.

7. The method of claim 1, wherein receiving the request to move the presentation of the web page includes detecting a configuration setting associated with the web page that indicates that the web page is to be presented within the emulation-based presentation environment.

8. The method of claim 1, wherein the web browser presentation environment includes a first set of machine executable instructions that are callable by the web page; and wherein the emulation-based presentation environment includes a second set of machine executable instructions that are callable by the web page.

9. The method of claim 1, wherein presenting the web page within the emulation-based presentation environment includes:

detecting that the web page was previously presented within the web browser presentation environment; and indicating to the web page that the web page has switched between presentation environments.

10. The method of claim 1, wherein presenting the web page within the emulation-based presentation environment includes:

detecting that the web page was previously presented within the web browser presentation environment; and creating emulation-based presentation data structure portion.

11. The method of claim 1, wherein presenting the web page within the web browser presentation environment includes providing the web page with access to a first file system but not providing the web page with access to a second file system; and wherein presenting the web page within the emulation-based presentation environment includes providing the web page with access to the second file system but not providing the web page with access to the first file system.

12. The method of claim 1, wherein presenting the web page within the web browser presentation environment includes executing the web page based, at least in part, upon a group of settings included within a first user profile; and wherein presenting the web page within the emulation-based presentation environment includes executing the web page based, at least in part, upon a group of settings included within a second user profile.

13. The method of claim 1, wherein the common presentation data structure portion includes at least one selected from the group consisting of information, variables or data about the web page.

14. The method of claim 13, wherein the common presentation data structure portion includes at least one selected from the group consisting of data entered into a text field, a state of a state machine created by a script associated with the web page, and a compressed image associated with the web page.

15. The method of claim 1, wherein the emulation-based presentation data structure portion of the second presentation data structure includes at least one selected from the group consisting of information, variables or data about or associated with the web page.

16. The method of claim 15, wherein the emulation-based presentation data structure portion includes at least one selected from the group consisting of a list of open web pages in which the web page has an entry, a decompressed version of a compressed image, configuration settings, a DOM tree derived from the web page and altered by a configuration setting or web extension.

17. A computing device comprising:

a memory element configured to:

store a first presentation data structure associated with a web page, the first presentation data structure including a web browser presentation data structure portion and a common presentation data structure portion, and store a second presentation data structure associated with the web page, the second presentation data structure including an emulation-based presentation data structure portion and the common data structure portion; and a processor configured to:

present at least one web page that includes markup language content within a context of a web browser presentation environment by executing a web browser software application in conjunction with a native operating system of the computing device, wherein presenting the web page within the context of the web browser presentation environment includes rendering the web page according to the markup language content and maintaining the first presentation data structure, receive, while the web page is being presented in the web browser presentation environment, a request to move the presentation of the web page that includes markup language content from the web browser presentation environment to an emulation-based presentation environment that is executed by a non-native operating system emulation software application of the computing device, in response to receiving the request, give control of the common data structure portion to the emulation based presentation environment, and in response to receiving the request, present the web page that includes markup language content within the emulation-based presentation environment, wherein presenting within the emulation-based presentation environment includes rendering the at least one web page according to the markup language content and maintaining the second presentation data structure, wherein the emulation-based presentation data structure portion is specific to the emulation-based presentation environment, and wherein the common data structure portion is not specific to either the web browser presentation environment or to the emulation-based presentation environment.

18. The apparatus of claim 17, wherein the processor is configured to:

receive a second request to move the presentation of the web page from the emulation-based presentation environment to the web browser presentation environment;

stop the presentation of the web page within the emulation-based presentation environment; and present the web page within the web browser presentation environment.

19. The apparatus of claim 17, wherein the processor is configured to:

hide a native operating system user interface of a native operating system environment from a user;

display, to the user, a non-native operating system user interface based upon the non-native operating system; and display the web page within the non-native operating system user interface.

20. The apparatus of claim 17, wherein the processor is configured to:

receive, via a native operating system environment, a request to present a second web page;

determine an association between the second web page and either the web browser presentation environment or the emulation-based presentation environment; and present the second web page, based upon the association, via either the web browser presentation environment or the emulation-based presentation environment.

21. A computer program product, the computer program product being tangibly and non-transitorily embodied on a computer-readable medium and including executable code that, when executed, is configured to cause a computing device to:

present at least one web page that includes markup language content within a web browser presentation environment, wherein the presenting includes executing a web browser software application in conjunction with a native operating system environment of the computing device, wherein presenting within the web browser presentation environment includes rendering the at least one web page according to the markup language content and maintaining a first presentation data structure that includes a web browser presentation data structure portion and a common presentation data structure portion;

receive, while the web page is being presented in the web browser presentation environment, a request to move the presentation of the web page that includes markup language content from the web browser presentation environment to an emulation-based presentation environment, wherein the emulation-based presentation environment includes a presentation environment created by a non-native operating system emulation software application executed within the native operating system environment of the computing device; and in response to receiving the request, move the presentation of the web page that includes markup language content from the web browser presentation environment to the emulation-based presentation environment, wherein moving includes rendering the at least one web page according to the markup language content and maintaining a second presentation data structure that includes an emulation-based presentation data structure portion and the common data structure portion, wherein the emulation-based presentation data structure portion is specific to the emulation-based presentation environment, and wherein the common data structure portion is not specific to either the web browser presentation environment or to the emulation-based presentation environment.

22. The computer program product of claim 21 wherein the executable code, when executed, is configured to cause the apparatus to:

present the web page within the web browser presentation environment by executing an web browser software application in conjunction with a native operating system environment; and present the web page within the emulation-based presentation environment by executing a non-native operating system emulation software application.

* * * * *